United States Patent [19]
Abdou-Sabet et al.

[11] Patent Number: 6,121,383
[45] Date of Patent: Sep. 19, 2000

[54] THERMOPLASTIC VULCANIZATES FROM BLENDS OF A POLYPROPYLENE AND ELASTIC α-OLEFIN/CYCLIC OLEFIN COPOLYMERS

[75] Inventors: Sabet Abdou-Sabet, Akron, Ohio; Bruce A. Harrington, Houston, Tex.; Patrick Brant, Seabrook, Tex.; Anthony J. Dias; Sudhin Datta, both of Houston, Tex.

[73] Assignees: Advanced Elastomer Systems, L.P., Akron, Ohio; Exxon Chemical Patents, Inc., Baytown, Tex.

[ * ] Notice: This patent is subject to a terminal disclaimer.

[21] Appl. No.: 09/062,809

[22] Filed: Apr. 20, 1998

Related U.S. Application Data

[63] Continuation-in-part of application No. 08/539,487, Oct. 6, 1995, Pat. No. 5,763,532, which is a continuation of application No. 08/324,287, Oct. 14, 1994, abandoned, which is a continuation-in-part of application No. 08/005,676, Jan. 19, 1993, Pat. No. 5,837,787.

[51] Int. Cl.$^7$ .............................. C08L 19/00; C08L 45/00
[52] U.S. Cl. .......................... 525/192; 525/210; 525/211; 525/216; 525/240
[58] Field of Search .................................... 525/192, 194, 525/210, 211, 216, 240

[56] References Cited

U.S. PATENT DOCUMENTS

| | | |
|---|---|---|
| 2,934,527 | 4/1960 | McKay . |
| 3,313,786 | 4/1967 | Kahle et al. . |
| 3,876,595 | 4/1975 | Ogura et al. . |
| 4,614,788 | 9/1986 | Kajiura et al. . |
| 4,634,735 | 1/1987 | Thiersault et al. .................. 525/211 X |
| 4,918,133 | 4/1990 | Moriya . |
| 4,990,559 | 2/1991 | Shiraki et al. . |
| 5,008,356 | 4/1991 | Ishimaru et al. . |
| 5,011,891 | 4/1991 | Spenadel et al. ....................... 525/211 |
| 5,087,677 | 2/1992 | Brekner et al. . |
| 5,292,811 | 3/1994 | Murata et al. . |
| 5,723,545 | 3/1998 | Harrington et al. . |

FOREIGN PATENT DOCUMENTS

| | | |
|---|---|---|
| 203 799 A1 | 12/1986 | European Pat. Off. . |
| 0 269 274 | 6/1988 | European Pat. Off. ............... 525/210 |
| 283 164 A2 | 9/1988 | European Pat. Off. . |
| 407 870 A2 | 1/1991 | European Pat. Off. . |
| 496 193 A1 | 7/1992 | European Pat. Off. . |
| 0504418 | 9/1992 | European Pat. Off. . |
| 214 623 | 10/1984 | Germany . |
| 2-47157 | 2/1990 | Japan . |
| 2-276816 | 11/1990 | Japan . |
| 3-76911 | 4/1991 | Japan . |
| 3-188145 | 8/1991 | Japan . |
| 3-203945 | 9/1991 | Japan . |
| 3-203950 | 9/1991 | Japan . |
| 3-207755 | 9/1991 | Japan . |
| 3-210348 | 9/1991 | Japan . |
| 2551145 | 8/1996 | Japan . |
| WO 92/06123 | 4/1992 | WIPO . |
| WO 92/16564 | 10/1992 | WIPO . |
| WO 92/16585 | 10/1992 | WIPO . |

OTHER PUBLICATIONS

European Chemical News, Apr. 4, 1994, p. 27.

*Primary Examiner*—Fred Teskin
*Attorney, Agent, or Firm*—William A. Skinner; Samuel B. Laferty

[57] ABSTRACT

Thermoplastic vulcanizate blends are prepared from a semi-crystalline polymer and a rubbery copolymer derived from copolymerizing at least one alpha-olefin monomer and at least one cyclic olefin copolymer. The rubbery copolymer also includes repeat units from at least one polyene monomer. The polyene monomer provides residual unsaturation for crosslinking of said rubbery copolymer. Crosslinking the rubbery copolymer of the blend generally reduces tension set, compression set and oil swell in aliphatic solvents. The cyclic olefin monomer reduces oil swell in aliphatic oils.

13 Claims, 1 Drawing Sheet

# THERMOPLASTIC VULCANIZATES FROM BLENDS OF A POLYPROPYLENE AND ELASTIC α-OLEFIN/CYCLIC OLEFIN COPOLYMERS

CROSS REFERENCE TO RELATED APPLICATIONS

This application is a continuation in part of U.S. Ser. No. 08/539,487 filed Oct. 6, 1995 now U.S. Pat. No. 5,763,532 which is a continuation of U.S. Ser. No. 08/324,287 filed Oct. 14, 1994 now abandoned which was a continuation in part of U.S. Ser. No. 08/005,676 filed Jan. 19, 1993 now U.S. Pat. No. 5,837,787.

FIELD OF INVENTION

This invention relates to thermoplastic vulcanizates of crystalline or semi-crystalline polyolefin, such as polypropylene, with predominately amorphous, elastomeric copolymers (rubbery copolymers) from alpha olefin and cyclic olefin monomers. The rubbery copolymers have reduced oil swell as compared to ethylene-proylene-diene copolymers (EPDM). Their use in a thermoplastic vulcanizate results in a vulcanizate with rubbery properties but with lower oil swell than similar vulcanizates with EPDM rubber.

BACKGROUND OF INVENTION

Semi-crystalline polyolefin such as polypropylene are versatile polymers useful in many applications since their crystallinity imparts desirable mechanical properties such as stiffness. They suffer however from brittleness in certain applications. One of the methods used to reduce the brittleness of semi-crystalline polymers is to blend them with low glass transition temperature (Tg) elastomers such as ethylene-propylene rubber or ethylene-propylene-diene modified terpolymers (EPRs and EPDMs). These blends with EPR or EPDM are less brittle and provide an improved impact resistance, however they often suffer from reduced gloss, haze, and poor tactile quality, as well as decreased flexural modulus when these properties are compared to the original semi-crystalline homopolymer. One reason for this loss of surface properties has to do with chain flexibility. Both the semi-crystalline polymers and the rubber copolymers that are blended with them comprise very flexible chains. They have similar packing lengths as defined and disclosed in Fetters, L. J., Lohse, D. J., Richter, D., Witten, T. A., and Zirkel, A. *Macromolecules,* 1994, and Brant, P., Karim, A., Sikka, M., and Bates, F. S., *J. Poly Sci., Poly. Phys. Ed.* 1994, incorporated by reference herein. Because of their similar flexibility and packing lengths, both polymers can reside at interfaces and surfaces with similar ease, i.e. when the chains come to an interface or surface, they can fold themselves to fit along the surface, or fold themselves to return to the bulk of the polymer without much trouble. Hence, there exists a roughly equal probability that both the rubber polymer (rubber phase) and the semi-crystalline polymer (continuous phase) of the blend can reside at the surface. In turn, two phases on the surface of a polymer contributes to a decrease in gloss and an increase in haze. Therefore, there exists a need in the art to provide blends of semi-crystalline polymers with impact modifying rubbers that achieve a balance of useful mechanical properties and desirable surface properties.

SUMMARY OF INVENTION

In accordance with the present invention, thermoplastic vulcanizates comprising a semi-crystalline polyolefin and a rubbery thermoplastic copolymer having good strength and surface properties without significant loss of optical or tensile properties are provided. The thermoplastic vulcanizates also have reduced oil swell in most hydrocarbon oils (aliphatic) due to the inclusion of repeat units in the copolymer from cyclic olefin monomers.

DETAILED DESCRIPTION OF THE INVENTION

Figure 1:
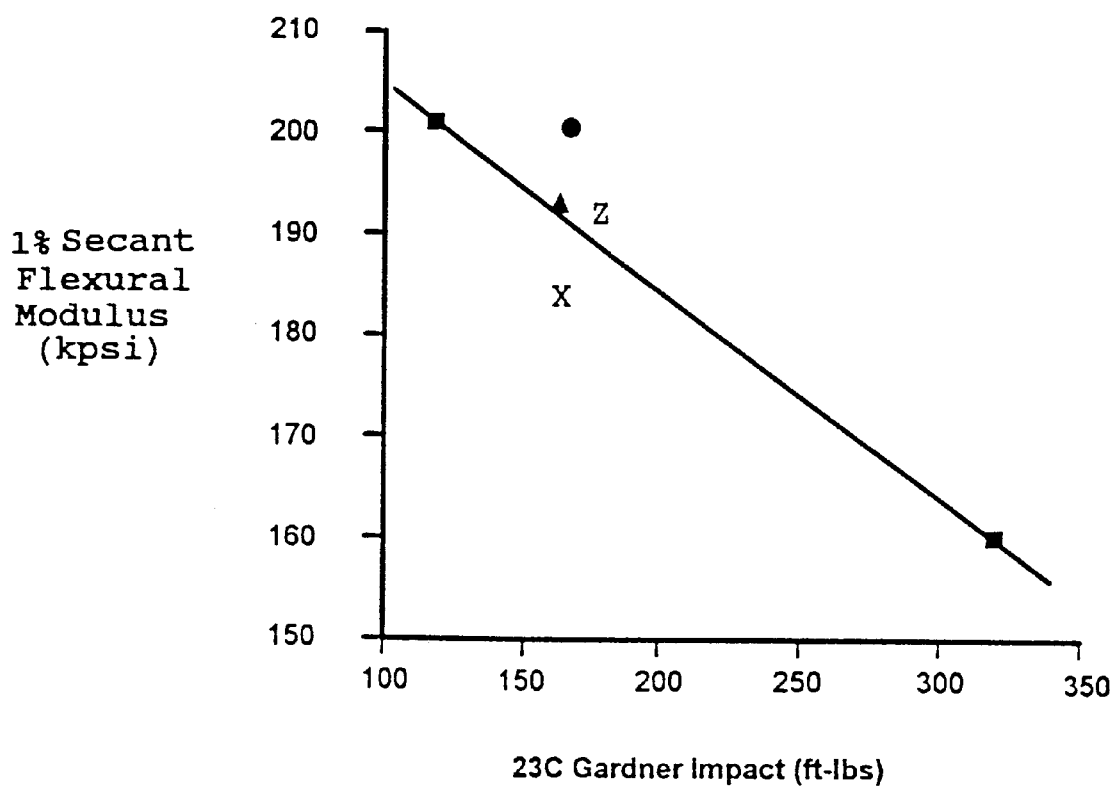
FIG. 1 is a plot of 1% Secant Flexural Modulus vs. 23° C. Garner Impact for neat polypropylene and blends P, Q, R and S.

The present invention relates to blends of a semi-crystalline polymer, such as polypropylene, with a rubbery copolymer with a significantly different surface tension, preferably a difference of 3 dynes per centimeter or more. In a preferred embodiment the rubbery thermoplastic copolymer has a surface tension 3 or more dynes/cm greater than the surface tension of the semi-crystalline polymer, even more preferably 5 dynes/cm greater, even more preferably 8 dynes/cm greater, even more preferably 10 dynes/cm greater. These blends have superior strength, haze and gloss properties, among others. In particular these blends have increased impact resistance without a significant reduction in flexural modulus and gloss.

Hereafter the use of the term polypropylene is merely exemplary, and is not intended to limit the scope of the invention in any way. Those of ordinary skill in the art will recognize the other semi-crystalline polymers comprising $C_2$ to $C_{40}$ α-olefins (e.g. polyethylene) would be used in a similar fashion.

In one set of embodiments the rubbery copolymer is typically present in the blend in amounts of up to about 90 weight % (e.g. from about 5 to about 90 weight %), preferably up to about 70 weight %, even more preferably up to about 50 weight % with the balance being made up of the semi-crystalline polymer, (wt % is based upon the weight of the blend of semi-crystalline polymer and rubbery copolymer). In embodiments for thermoplastic vulcanizates preferred ranges for the rubbery copolymer are from about 10, 15 or 20 to about 90, more preferred from about 25 to about 75 or 80, and most preferred from about 50 to about 75. In thermoplastic vulcanizates the semi-crystalline polymer is desirably from about 10 to about 80, 85 or 90, more desirably from about 20 or 25 to about 75, and preferably from about 25 to about 50 weight percent of said blend. In an alternate set of preferred embodiments the rubbery thermoplastic copolymer is present at about 0.5 to about 45 wt %, even more preferably 1 to about 30 wt %, even more preferably about 10 to about 25 wt %, with the balance being made up by the semi-crystalline polymer.

Preferred semi-crystalline polymers that may be blended or combined with the rubbery copolymers include propylene, homopolymers and copolymers. Desirably the semi-crystalline Polymers are at least 85, 90 or 95 wt % of repeat units from a single monomer such as ethylene or propylene. The homopolymers preferably have about 95% or more heptane insolubles, more preferably about 97% or more heptane insoluables (Insolubles measured on bulk polymer samples dried at 100° C., in a vacuum oven prior to boiling in n-heptane for 1.5 hours. Thereafter samples are vacuum dried, rinsed with acetone, dried further in a vacuum oven at 100° C., and thereafter heated in a muffle furnace for 8 hours at 1100° F., (593° C.). Heptane insolubles=100×

(weight of sample after heating in muffle furnace divided by weight of the sample prior to combining with n-heptane).) The copolymers may be copolymers of propylene with an aliphatic or aromatic cyclic or branched olefin, preferably ethylene or any $C_4$ to $C_{100}$ α-olefin, preferably ethylene or any $C_4$ to $C_{20}$ α-olefin. For the purposes of this invention ethylene is considered an α-olefin. The semi-crystalline polymers can be reactor copolymers having the specified amount of ethylene or propylene. Such propylene copolymers and homopolymers are well known in the art and are commercially available under many trade names.

Rubbery copolymers with lower flexibility can be made by incorporating rigid or bulky comonomers into the polymer chains which inhibit crystallization of the copolymers. For example the rubbery copolymer can be an alpha-olefin, preferably ethylene or propylene, with a cyclic olefin, preferably norbornene and the like, or styrene or the like. Preferred rubbery thermoplastic copolymers and methods to make them are disclosed and claimed in U.S. patent application Ser. No. 08/005,676, filed Jan. 19, 1993 (now published as WO 9417113, pub. Aug. 11, 1994), which is incorporated by reference herein. Preferred rubbery thermoplastic copolymers of an α-olefin and a cyclic olefin which are blended with the polypropylene described above are preferably copolymers which can be made, for example, by polymerizing cyclic olefin comonomers with one or more α-olefins in the presence of a coordination catalyst, preferably a single site catalyst. Preferred rubbery thermoplastic copolymers generally comprise from about 5 to about 25 or 30 mole percent of the cyclic comonomer, preferably from about 10 to about 20 or 25 mole percent of the cyclic comonomer. Desirably the cyclic olefin is a norbornene monomer of the structure

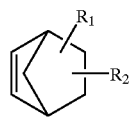

including mono or dialkyl substituted norbornene where the $R_1$ and $R_2$ groups are individually hydrogen or an alkyl of 1 to 4 or 8 carbon atoms. Desirably the amounts of cyclic olefin are for monounsaturated cyclic olefin. Desirably the amount of alpha-olefin specified is for monounsaturated alpha-olefin. Desirably the amount of at least one alpha-olefin in the rubbery copolymer is from about 60, 69, or 70 to about 94 or 95 mole percent, more desirably from 72 or 79 or 80 to about 90 mole percent of the total repeat units. Desirably a polyene, which can be a linear or cyclic olefin with 2 or more carbon to carbon double bonds, are present in amounts from about 0.1, 0.5 or 1 to about 10 mole percent and more desirably from about 0.1, 0.5, 1 or 2 to about 5 or 8 mole percent. These polyenes desirably have from about 5 to about 20 carbon atoms and include the dienes used in the EPDM along with other dienes set forth in this specification.

Preferred rubbery thermoplastic copolymers have a high molecular weight up to 2,000,000 or more, preferably from about 30,000 to about 1,000,000 even more preferably from about 50,000 to about 500,000, even more preferably 80,000 to about 250,000. (As used herein, molecular weight refers to the weight average molecular weight ($M_w$) unless otherwise indicated.) In preferred embodiments the rubbery thermoplastic copolymers may have a relatively narrow molecular weight distribution (MWD), i.e. ($M_w/M_n$) of less than about 4, preferably less than about 2. The rubbery thermoplastic copolymers generally have a glass transition temperature (Tg) in the range of −50° C., to 50° C., preferably −15° C. to about 25° C. As used herein $T_g$ is determined by differential scanning calorimetry (DSC) under ASTM E 1356.

The rubbery copolymers also have a number of unusual properties which make them rather desirable for blends with polypropylene and other semi-crystalline copolymer, such as toughness, optical clarity, and low oil swell in many hydrocarbon oils combined with elasticity and good recovery after elongation. (As used herein, ultimate tensile strength, elongation at break, and recovery are determined at 25° C., using procedures in accordance with ASTM D-412, unless otherwise noted.)

In addition to having a long statistical chain segment length, the preferred rubbery thermoplastic copolymers desirably have:

1) an elongation at break of 300% or more and especially of 400% or more;
2) a tensile strength at 150% elongation of at least 800 psi (5.5 MPa), preferably at about 1000 psi (6.8 MPa);
3) an elastic recovery of at least 70% after 10 minutes relaxation from 150% elongation, more preferably recovery of at least 80%;
4) an ultimate tensile strength of at least 2500 psi (17.2 MPa), more preferably above 3500 psi (24.1 MPa) and/or
5) a surface tension of about 33 dynes/cm or more, preferably about 37 dynes/cm or more.

The rubbery copolymers described above are also unique in that they remain elastic well above their glass transition temperatures and remain ductile well below their Tg. In general, the copolymer remains rubbery at temperatures above the approximate $T_g$ (as measured by DSC) of the copolymer, for example, from the Tg (−50° C. to 50° C.) to above 100° C., preferably above 150° C. In another preferred embodiment the rubbery copolymer is elastic over the temperature range of from its Tg to 100° C. above its Tg, preferably over the range of from its Tg to 150° C. above its Tg. This unusual elasticity may also be reflected by a rubbery storage modulus over this temperature range. The rubbery storage modulus of the copolymers is readily observed as a plateau between about 1 and about 100 MPa by dynamic mechanical thermal analysis (DMTA) at a frequency of 1 to 10 Hz with a 2° C./min temperature ramp using commercially available DMTA equipment, for example, from Polymer Laboratories, Inc. The ductile-brittle transition can be measured by ASTM D-746 and although the rubbery thermoplastic copolymers may have a Tg of −5° C. to 5° C. as measured by DSC, they remain ductile to temperature below −20° C., and even to temperatures below −30° C.

If desired, the rubbery modulus can be extended to higher or lower temperatures or shifted by the optional use of crosslinking (highly preferred), plasticizing additives, or a combination of crosslinking and plasticizers. In general, plasticizers tend to lower the temperature at which the copolymer becomes brittle, while crosslinking raises the temperature at which the copolymer will flow or otherwise suffer a significant reduction in strength. Crosslinking may also decrease the compression set and tension set when these properties are decreased by flow in the uncrosslinked rubber phase.

Surface tension is measured by using standard treatment solutions well known in the art (ASTM D2578-94). ASTM D2578-94 is hereby incorporated by reference. A typical ethylene-norbornene copolymer having about 10 mol % norbornene has a surface tension of about 41 dynes/cm and typical polypropylene has a surface tension of about 30 or 31 dynes/cm.

The α-olefin(s) which are copolymerized with the cyclic olefin(s) to make the rubbery thermoplastic copolymer can be any unsaturated copolymerizable monomer having at least 2 carbon atoms, or mixture or combination thereof. Typically, the α-olefin is a substituted or unsubstituted $C_2$–$C_{20}$ α-olefin, such as, for example, ethylene, propylene, 1-butene, 1-pentene, 3-methyl-pentene-1,4-methylpentene-1,2-hexene, 1-heptene, 1-octene, 1-nonene, 1-decene, 1-undecene, 1-dodecene, 1-tetradecene, 1-hexadecene, 1-octadecene, 1-eicosene, 3,5,5-trimethylhexene-1, allyltrimethyl silane, and the like; or vinyl aromatic and alicyclic monomers, such as, for example, styrene, alkyl-substituted styrene, vinyl cyclohexene, and the like. The α-olefin can also be (or include) a longer α-olefin (having 10 or more carbon atoms), a branched α-olefin or a polyene, or a combination thereof; either alone as the sole α-olefin comonomer(s), or more preferably as a termonomer in combination with a $C_2$–$C_{20}$ α-olefin, particularly a $C_2$–$C_8$ α-olefin, especially ethylene, propylene or a mixture of ethylene and propylene. (As used herein the term "α-olefin" or "alpha-olefin" is intended to refer generically to longer α-olefin, branched α-olefins, and polyenes, as well as the more usual $C_2$–$C_{20}$ α-olefins more desirably $C_2$–$C_{12}$ alpha-olefins. Also as used herein the term copolymer is intended to refer to polymers of two or more different monomers.) =p In general, any cyclic olefin can be copolymerized with the α-olefin to produce the rubbery copolymer provided the cyclic olefin includes cyclized ethylenic or acetylenic unsaturation or ethylenic or acetylenic unsaturation pendant to the cyclic structure as in styrene or vinylcyclohexane, said unsaturation which undergoes addition polymerization in the presence of the catalyst (substantially without ring opening) so that the ring structure in which the unsaturation is present is incorporated into the polymer backbone. A method to prepare the rubbery copolymers and a lengthy list of preferred cyclic monomers is disclosed in PCT publication WO/9417113, published Aug. 11, 1994, and incorporated by reference herein.

Especially preferred cyclic olefins include cyclobutene, cyclopentene, deltacyclene, norbornene, methylnorbornene, tetracyclododecene, methyltetracyclododecene, dimethyltetracyclododecene, tricyclo(4.3.0.1$^{2,5}$)-3-decene, and pentacyclo(4.7.0.1$^{2,5}$.0$^{8,13}$.1$^{9,12}$). Of these, norbornene is preferred for its ready commercial availability and effectiveness.

Polyenes having two or more double bonds can optionally be used in a relatively minor proportion to impart higher molecular weight to the copolymer and/or provide residual pendant side chain unsaturation for functionalization or crosslinking. Where the polyenes can participate in polymerization at two (or more) sites, these monomers tend to promote chain extension which can double or quadruple the molecular weight at low incorporation rates, and also raise the upper temperature at which the rubbery storage modulus plateau is present. Ideally the polyene is not present in such high amounts which might result in excessive crosslinking and produce insoluble gel formation during polymerization. Preferably, the molecular weight is suitably increased by including the optional polyene in the copolymer at from 0.5 to 3 or 5 mole percent.

Suitable polyenes include, for example, α, ω-dienes having from 5 to 18 carbon atoms, such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, or the like.

When two (or more) of the double bonds are sufficiently reactive under the particular reaction conditions to participate in the polymerization reaction, suitable optional polyenes generally also include other linear or branched aliphatic dienes and trienes, monocyclic dienes and trienes, bicyclic dienes and trienes, polycyclic dienes, aromatic dienes, and the like. Specific representative examples of non-conjugated polyenes include 1,4-hexadiene, 6-methyl-1,4-heptadiene, 4-isopropyl-1,4-hexadiene, 4-methyl-1,4-hexadiene, 5-methyl-1,4-hexadiene, 4-ethyl-1,4-hexadiene, 4-isopropyl-1,4-hexadiene, 6-phenyl-4-propyl-1,4-hexadiene, 4,5-dimethyl-1,4-hexadiene, 6-phenyl-1,4-hexadiene, 5-methyl-1,5-octadiene, 6-methyl-1,5-octadiene, 6-methyl-1,5-heptadiene, 5,7-dimethyl-1,5-octadiene, 4,5-dipropyl-1,4-octadiene, 5-propyl-6-methyl-1,5-heptadiene, 5-ethyl-7-methyl-1,6-octadiene, 1,5-hexadiene, 1,6-heptadiene, 1,6-octadiene, 1,7-octadiene, 1,8-nonadiene, 1,8-decadiene, 1,9-decadiene, and 1,10-undecadiene; dicyclopentadiene, tricylopentadiene, 1-vinyl-4-(1-propenyl)-cyclohexane, 4-methylcyclo-1,4-octadiene, 4-methyl-5-propylcyclo-1,4-octadiene, 5-methylcyclopentadiene, 4-methyl-5-ethyldicyclopentadiene, 5-isopropyidicyclopentadiene, 1,5,9-cyclododecatriene, 4-(1-butenyl-2)-styrene, 4-2-butene-2-yl)-styrene and trans-1,2-divinylcyclobutane, 5-ethylidenenorbornene-2, 5-propylidenenorborne-2, 5-butylidenenorbornene-2, 5-isopropylidene-norbornene-2, 2-methyl-2,5-norbornadiene, 5-methyl-2,5-norbornadiene, 2-propyl-2,5-norbornadiene, 5-methylene-2-norbornene, 5-(2-butenyl)-2-norbornene, 3-heptyl-2,5-norbornadiene, 2-ethyl-3-propyl-2,5-norbornadiene, 2-(1',5'-dimethylhexene-4-yl)-2,5-norbornadiene.dicyclopentadiene, 5-isopropyidicyclopentadiene, 5-isopropylidenebicyclo (2.2.2)octene-2, 5-ethylidenebicyclo(2.2.2)octene-2, 5-butylidenebicyclo(2.2.2)octene-2, 2-ethylbicyclo(2.2.2) octadiene-2,5, 2-hexylbicyclo(2.2.2)-octadiene-2,5, 2-(1$^1$, 5$^1$-dimethylhexenyl-4)bicyclo(2.2.2)-octadiene-2,5, 1-isopropylidenebicyclo(4.4.0)decadiene-2,6, 2-isopropylidenebicyclo(4.4.0)decene-6, 2-ethylidenebicyclo(4.4.0)decene-6, 3-ethylidenebicyclo (3.2.0)heptadiene-2,6,3-methylbicyclo(3.3.0)octadiene-2,6, 3-methyltetrahydroindene, 6-methlytrahydroindene, 2-propyltetrahydroindene, 1-isopropylidenctetrahydroindene, 1-(1'-phenyl)-ethylidenetetrahydroindene and the like.

In a preferred embodiment, the polymerization methodology is practiced in the manner and with the catalyst systems referred to, disclosed, and described in the following references: U.S. Pat. No. 5,055,438; U.S. Pat. Nos. 5,507,475; 5,096,867; WO 92 00333; U.S. Pat. No. 5,264, 405; U.S. Pat. No. 5,324,800; CA 1,268,753; U.S. Pat. Nos. 5,017,714; 5,240,894; U.S. Pat. No. 5,198,401; U.S. Pat No. 5,153,157; WO 94 03506; EPA 520,732, pub Dec. 30, 1992; EPA 129,368, pub. Dec. 27, 1984; and EPA 277,003 & 277,004, pub. Jun. 3, 1988, which are hereby incorporated herein by reference.

Generally, the preferred catalyst systems employed in preparing the copolymer of the invention can comprise a complex formed upon admixture of a Group 4 transition metal component with an activating component. The catalyst system can be prepared by addition of the requisite transition metal and alumoxane components, or a previously cationically activated transition metal component, to an inert solvent in which olefin polymerization can be carried out by a solution, slurry or bulk phase polymerization procedure.

Optimum results are generally obtained when the Group 4 transition metal compound is present in the polymerization diluent, in a concentration of preferably from about 0.00001 to about 10.0 millimoles/liter of diluent and the activating component is present in an amount to provide a molar activating component to transition metal ratio of from about 0.5:1 to about 2:1 or more, and in the case of alumoxane, the molar alumoxane to transition metal can be as high as 20,000:1. Sufficient solvent is normally used so as to provide adequate heat transfer away from the catalyst components during reaction and to permit good mixing.

The catalyst system ingredients, that is, the transition metal, the alumoxane and/or ionic activators, and polymerization diluent can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 25° C. to 100C., most preferably about 25° C.

In a preferred embodiment, the catalyst system is utilized in the liquid phase (slurry, solution, suspension or bulk phase or combination thereof), high pressure fluid phase or gas phase (where the α-olefin and cyclic olefin are sufficiently volatile, e.g. up to $C_8$) for copolymerization of α-olefin and cyclic olefin. These processes may be employed singularly or in series. The liquid phase process comprises the steps of contacting α-olefin and cyclic olefin with the catalyst system in a suitable polymerization diluent and reacting said monomers in the presence of said catalyst system for a time and at a temperature sufficient to produce a copolymer of high molecular weight. Conditions most preferred for the copolymerization of α-olefin are those wherein α-olefin is submitted to the reaction zone at pressures of from about 0.019 psi (0.1 Kpa) to about 50,000 psi (345 Mpa) and the reaction temperature is maintained at from about −100° C. to about 300° C. The reaction time is preferably from about 10 seconds to about 4 hours.

One example of polymerization for production of the α-olefin/cyclic olefin copolymer is as follows: in a clean, dry and purged stirred-tank reactor containing solvent and optional scavenger, liquid comonomer is introduced, such as 2-norbornene. The catalyst system is introduced via nozzles in either the vapor or liquid phase. Feed ethylene (or other olefin) gas is introduced either into the vapor phase of the reactor, or sparged into the liquid phase as is well known in the art. The reactor contains a liquid phase composed substantially of solvent, liquid comonomer, together with dissolved ethylene gas, and a vapor phase containing vapors of all monomers. The reactor temperature and pressure may be controlled via reflux of vaporizing comonomer (autorefrigeration), as well as by cooling coils, jackets etc. The polymerization rate is generally controlled by the concentration of catalyst. The ethylene and comonomer contents of the polymer product are determined by NMR and manipulating the ratio of ethylene to comonomer in the reactor.

Alternatively, the α-olefin/cyclic olefin copolymer can be prepared by a high pressure process. The high pressure polymerization is completed at a temperature from about 105° C. to about 350° C., preferably from about 120° C. to about 250° C. and at a pressure of from about 100 bar to about 3200 bar, preferably from about 200 bar (20 Mpa) to about 1300 bar (130 Mpa), in a tubular or stirred autoclave reactor. After polymerization and catalyst deactivation, the product copolymer can be recovered using conventional equipment for polymer recovery, such as, for example, a series of high and low pressure separators wherein unreacted α-olefin, and unreacted cyclic olefin in some instances, particularly when the comonomer is relatively volatile, can be flashed off for recycle to the reactor and the polymer obtained extruded in an underwater pelletizer. An advantage of the high pressure process is that the flashing off of the cyclic olefin is relatively effective, particularly at the ratio of cyclic olefin: α-olefin used in the copolymerization to obtain the desired comonomer incorporation in the copolymer.

Pigments, antioxidants, and other known additives and fillers, as are known in the art, can be added to the polymer.

The copolymerization process can be a continuous or batch reaction. Typically, the continuous process, where reactants are continuously fed to the reactor and product continuously withdrawn, is preferred in commercial production facilities for economic reasons. The continuous process also has the advantage of promoting more uniform comonomer incorporation into the polymer.

As before noted, any suitable coordination catalyst system can be used. Preferably, however, the catalyst system has the ability to incorporate a relatively high content of the comonomer. The catalyst preferably has a relatively low α-olefin:cyclic olefin reactivity ratio less than about 300, more preferably less than 100, and especially from about 25 to about 75. Accordingly, the selection of the transition metal component, and other catalyst system components, is another parameter which may be utilized as a control over the α-olefin content of a copolymer with a reasonable ratio of α-olefin to cyclic olefin feed rates.

Preferred catalyst systems include:

$Cp_2ZrMe_2$ combined with DMAH $B(pfp_4)$;

$Cp_2ZrCl_2$ combined with MAO;

$Cp_2HfMe_2$ combined with DMAH $B(pfp_4)$;

$Cp_2HfCl_2$ combined with MAO;

$Me_2Si$ bis(Ind)$HfMe_2$ combined with DMAH $B(pfp_4)$;

$Me_2Si$ bis(Ind)$HfCl_2$ combined with MAO;

Dimethylsilyl(tetramethyl-cyclopentadienyl) (amidocyclododecyl)titanium dichloride combined with MAO;

Dimethylsilyl(tetramethyl-cyclopentadienyl) (amidocyclododecyl)titanium dichloride combined with DMAH B $(pfp_4)$.

$Me_2Si$ ($H_4$ Ind)$ZrCl_2$ combined with MAO; and $Me_2Si$ ($H_4$ Ind)$ZrMe_2$ combined with DMAH $B(pfp_4)$.

Abbreviations: Cp=cyclcpentadienyl, Me=methyl, DMAH $B(pfp_4)$=dimethylanilinium tetra(perfluorophenyl) borate, MAO=methylalumoxane, and Ind=indenyl.

In a preferred embodiment rubbery α-olefin/cyclic olefin copolymer (preferably an ethylene/norbornene copolymer) would be polymerized by the following procedure: A 1-liter or 2-liter autoclave reactor equipped with a paddle stirrer, an external water or steam jacket for temperature control, a regulated supply of dry nitrogen, ethylene, propylene, toluene and hexane, and a septum inlet for introduction of comonomer, transition metal compound, co-catalyst and scavenger solutions would be dried and purged thoroughly prior to use. Optionally solvent, if used, would be introduced to the reactor (typically toluene or hex). A quantity of cyclic olefin (typically in toluene or a hexanes solvent), optionally a scavenger would be added by cannula (typically an $AIR_3$, preferably TEAL or TIBA, most preferably TIBA) and the ethylene or propylene monomer (as a liquid or gas) would be introduced into the reactor. The reactor would then heated to between 30° C.–80° C., and a toluene solution of the transition metal compound, previously activated by the co-catalyst, will be introduced into the system by cannula using high pressure nitrogen or solvent. The polymerization reaction would be generally conducted for 10 to 120 minutes. The reaction will be halted by rapidly cooling and venting the system. The resulting polymer would be recovered by precipitation in methanol and/or isopropanol, filtration and drying the polymer in vacuo for about 12–48 hours at ambient temperature up to 100° C.

Scavengers, when used, would be 2.0 molar solutions of triisobutyl aluminium (TIBA), trimethyl aluminum (TMA), diisobutyl aluminum (DiBAL), or triethyl aluminum (TEA). Possible transition metal compounds include dimethylsilyl bis(indenyl) hafnium dimethyl, dimethylsilyl(tetramethylcyclopentadienyl) (amidocyclododecyl)titanium dichloride, bis(cyclopentadienyl)zirconium dimethyl or dimethylsilyl bis(tetrahydroindenyl)zirconium dichloride.

The blends, including the cured blends discussed below, produced herein are useful in any application where rubber toughened polypropylene has been used in the past. For example the blend may be molded, blown, cast, extruded or otherwise formed into articles. Example include automotive trim, automotive bumpers, packages, containers, films, sheets, strips and the like.

Thermoplastic vulcanizates are a preferred blend in this specification. They can vary from small particles of crosslinked rubber dispersed in a thermoplastic phase to co-continuous phases of thermoplastic and rubber. While thermoplastic elastomers includes compositions without crosslinks, thermoplastic vulcanizates require partial or full crosslinking of at least one rubber component. The rubbery copolymer of this specification is desirably crosslinked to an extent that at least 50 wt. %, more desirably at least 70 or 75 wt. % and preferably at least 85 or 90 wt. % of the rubbery copolymer is not extrable in a good solvent for the rubbery copolymer. U.S. Pat. No. 4,311,628 is incorporated by reference for its teachings on determining extractable rubber from thermoplastic vulcanizates. Desirably the rubbery copolymer is crosslinked through adding chemical bonds (e.g. fragments of a phenolic resin curative) to the repeat units from polyenes in the rubbery copolymer and most preferably to the residual carbon to carbon double bond of the polyenes in the rubbery polymer.

Thermoplastic vulcanizes refers to compositions that possess the general physical properties of a thermoset elastomer and are reprocessable in thermoplastic processing equipment. Upon reaching temperatures above the softening or melting point of the thermoplastic phase (e.g. semi-crystalline polymer), they can form continuous sheets and/or molded articles with relative complete knitting or fusion of the thermoplastic vulcanizate under conventional molding and shaping conditions for thermoplastic polymers.

The thermoplastic vulcanizates of this disclosure are generally prepared by melt-mixing the semi-crystalline polymer and the rubbery copolymer and optionally other ingredients (filler, plasticizer, lubricant, processing aid, antioxidant, stabilizer, etc.) In a mixer at a temperature above the softening or melting temperature of the polymers. The optional components can be added at different times (prior to, during, or subsequent to) a variety of mixing and vulcanization steps. One skilled in the art will add the optional components at times most conducive to the desired properties of the additives and thermoplastic vulcanizate. After sufficient melt mixing to form a well mixed blend with the desired phase morphology (including phase size), the curatives (crosslinking or vulcanizing agents) are generally added. In some embodiments it is desirable to add the curatives as a solution in a liquid such as oil which is compatible with the other components. It is convenient to follow the progress of vulcanization by monitoring the mixing torque or mixing energy requirements during mixing. The mixing torque or mixing energy generally goes through a maximum, after which mixing can be continued somewhat longer to improve fabricability of the blend. If desired, one can add some of the additives (e.g. oil or additional oil) after dynamic vulcanization is complete. After discharge from the mixer, the blend containing vulcanized rubber and semi-crystalline polymer can be milled, chopped, extruded, pelletized, injection molded, or processed by any other desirable technique.

It is usually desirable to allow the fillers and a portion of any plasticizer to distribute themselves in the rubbery copolymer or semi-crystalline polyolefin phase before the rubber phase is crosslinked. Crosslinking (vulcanization) of the rubber can occur in a few minutes or less depending upon the mix temperature, shear rate, and activators present for the curative. Suitable curing temperatures include from about 120° C. when using a semi-crystalline polyethylene phase or 175° C. when using a semi-crystalline polypropylene phase to about 250° C. More preferably temperatures are from about 170° C. to about 200° C. or 225° C. These temperatures are controlled more by the processing temperature for the semi-crystalline polyolefin than by the activation temperature for the curatives. Mixing equipment can include batch or continuous mixers such as Banbury™ mixers, Brabender™ mixers and certain mixing extruders.

The thermoplastic vulcanizate can, as noted above, include a variety of additives. The additives include particulate fillers such as carbon black, silica, titanium dioxide, colored pigments, clay, zinc oxide, stearic acid, stabilizers, antidegradants, flame retardants, processing aids, adhesives, tackifiers, plasticizers, wax, discontinuous fibers (such as wood cellulose fibers) and extender oils. When extender oil is used, it can be present in amounts from about 5 to about 300 parts by weight per 100 parts by weight of crystalline polyolefin and rubber. The amount of extender oil (e.g. paraffinic, aromatic and naphthenic oils) may also be expressed as from about 30 to about 250 parts, more desirably from about 70 to about 200 parts by weight per 100 parts by weight of said rubbery copolymer. Oils can extend and soften the rubber phase (e.g. lower the Tg of the blend of rubber and oil as compared to the rubber alone). Oils may improve other properties of the blend (e.g. ultimate tensile strength) due to changing phase sizes of the rubber phase or plastic phase or changing the interactions of the rubber phase and the plastic phase at the interface. Oils can be aliphatic, aromatic, or naphthenic oils or blends thereof. Aromatic and naphthenic oils are generally preferred due to their compatibility with the repeat units from the norbornene type monomers. When non-black fillers are used, it is desirable to include a coupling agent to enhance the interface between the non-black fillers and the polymers. Desirable amounts of fillers, e.g. carbon black, when present, are from about 40 to about 250 parts by weight per 100 parts by weight of said rubber.

Any conventional cure system for unsaturated rubbers to be dynamically vulcanized can be used in the dynamic vulcanization process. These include sulfur curatives as well as non-sulfur curatives. Another cure system that may be used with appropriate repeat units in the cyclic olefin copolymer is hydrosilation crosslinking as taught in U.S. Pat. No . 5,672,660 herein incorporated by reference. Sulfur curatives includes sulfur and sulfur-based accelerators such as the guanidines, thiurams, thiocarbonates, mercaptobenzothiazols, benzothiazol disulfides, thiuram sulfides, zinc dialkyl dithiocarbamates, etc. The non-sulfur cure system include peroxides and the various phenolic resins. Examples of useful peroxides include the organic peroxides such as laurel peroxide, benzoyl peroxide, tertiary butyl peroctoate, tertiary butyl perbenzoate, dicumyl peroxide, and azo compounds such as azobisisobutylnitrile, and the like. The peroxide-based cure systems may be used with or without co-agents such as sulfur, ethylene dimethacrylate, polyethylene glycol dimethacrylate, trimethylol propane, trimethacrylate, divinyl benzene, diallyl itaconate, triallyl cyanurate, diallyl phthalate, allyl methacrylate, cyclohexyl methacrylate, m-phenylene bismaleimide, and the like. When peroxide-based cure systems are utilized it is often desirable to include co-agents capable of enhancing the cure state and inhibiting chain fragmentation or chain scission to other polymers. The other polymers to be protected include polypropylene. Examples of specific co-agents include maleimide compounds and bismaleimide compounds such as m-phenylene bismaleimide (4,4'-m-phenylene bismaleimide), 4,4'-vinylenediphenyl bismaleimide, p-phenylene bismaleimide, 4,4'-sulfonyldilphenyl bismaleimide, 2,2'-dithiodiphenyl bismaleimide, 4,4'-ethylene-bisoxyphenyl bismaleimide, 3,3'-dichloro-4,4'-biphenyl bismaleimide, o-phenylene bismaleimide, m-phenylene bismaleimide (HVA-2), hexamethylene bismaleimide and 3,6-durine bismaleimides. The maleimide and bismaleimide compounds will generally be used in an amount equal to about 1.0 to about 10 parts per hundred parts of rubber and it can be used with both peroxide and non-peroxide curing systems. Another useful co-agent to prevent chain fragmentation or scission effects of polypropylene and other polymers with tertiary carbon atoms is adding isobutylene polymers. Suppression of chain fragmentation and scission effects can also be achieved by delaying the introduction of some of the portion of the polyolefin resin, generally less than about one half of the total amount of polyolefin resin used. To best avoid excessive crosslinking of the polyolefin resin, it will comprise a significant portion of a polypropylene homo- or copolymer. By "significant portion" it is meant that at least 12 weight percent polypropylene based upon the total weight of resin plus rubber is present. Thus, where a peroxide cure system is utilized, the polyolefin resin will preferably be polypropylene or a mix of polypropylene and other olefin-based resins.

Stress/strain properties of the thermoplastic vulcanizate compositions are determined in accordance with the test procedures as set forth in ASTM D-412. These properties include tension set (TS), ultimate tensile strength (UTS), 100 percent modulus (M100), and ultimate elongation at break (UE).

EXAMPLES

Ethylene/norbornene copolymer (ENB1) was produced according to the following procedure:

About 15.5 g norbornene dissolved in 400 ml hexanes were added to a one liter Zipperclave reactor equipped with a paddle stirrer; an external water or steam jacket for temperature control; a regulated supply of dry nitrogen, ethylene, propylene, toluene and hexane; and a septum inlet for introduction of comonomer, transition metal compound, co-catalyst and scavenger solutions. The reactor was dried and purged thoroughly prior to use. Ethylene was introduced at a pressure of 50.0 psig (345 kPa) and the reactor was heated (30° C.) and stirred. 23.0 mg of the bis (cyclopentadienyl) zirconium dimethyl (a molar excess) and 9.6 mg of dimethylanilinium tetra(perfluorophenyl) borate were mixed in toluene (2–3 ml) and left to activate for 10 minutes. This two-phase oil/toluene mixture was sealed in a vial with septa, the vial was connected to the reactor via cannula and then pressurized with $N_2$ in the reactor. The polymerization reaction was conducted for 19 minutes, yielding 3.91 g of copolymer, ENB2 and ENB3, were made following the procedure above except for the differing conditions noted in Table 1which reports the polymerization and some physical data.

TABLE 1

Rubbery Ethylene/Norbornene Copolymer Data

|  | ENB1 | ENB2 | ENB3 | ENB4 |
|---|---|---|---|---|
| $Cp_2ZrMe_2$ (mg) | 23 | 16 | 42 | v |
| DMAH B(pfp$_4$) (mg) | 9.6 | 20 | 48 | v |
| Temp (° C.) | 40 | 50 | 40 | 40 |
| $C_2$(psi/kPa) | 50/345 | 36/248 | 38.8/268 | 35/241 |
| Norbornene | 15.5 g | 38.8 g | 38.8 g | 40 g |
| Time (hr) | 0.33 | 0.33 | 0.25 | v |
| Yield (g) | 3.91 | 52.0 | NA | v |
| Act. (g/g-h) | 24,300 | 25.00 | NA | v |
| Mw | 67,000 | 110,000 | 150,000 | 72,000 |
| Mol % NB* | 11.9 | 11.7 | 8.7 | 14.0 |
| Stress @ (psi/Mpa) | 3140/22 | NA | NA | 3840/26 |
| Elong. # (%) | 535 | NA | NA | 443 |

Elong. # = elongation at break as measured by ASTM 412.
Stress @ = stress at maximum load as measured by ASTM 412.
Mol % NB = mole percent of norbornene in the polymer as measured by $^{13}$CNMR and/or $^1$HNMR.
V = Variable. ENB4 was a composite blend of many small batch runs. The values given are for the final blended material
ENB5 is ENB4 with a stabilizer package of IRGAPHOS 168 ™ (750 ppm) and IRGANOX 1076 ™ (1500 ppm) added.
NA = Data Not available.

Several polypropylenes were made or purchased. These were:

(1) PP1—high crystallinity, brittle, isotactic PP (98.7% heptane insolubles) made using a supported $TiCl_4$/MgCl catalyst activated with a methylcyclohexyldimethoxysilane donor in typical commercial slurry conditions.

(2) PP2—a commercially available isotactic PP homopolymer sold under the trade name ESCORENE PP1012™ by Exxon Chemical Company having a melt flow rate of 5.0 g/10 min (ASTM D 1238-65T condition L);

(3) PP3—a commercially available polypropylene homopolymer sold under the trade name Escorene PD 3345E from Exxon Chemical Company, having a melting point of 165° C. and a melt flow rate of 35 g/10 min (ASTM D 1238-65T condition L);

(4) PP4—a commercially available polypropylene homopolymer sold under the trade name Escorene PD 4193 from Exxon Chemical Company, having a melt flow rate of 7.3 g/10 min (ASTM D 1238-65T condition L); and (5) PP5—a low melt flow rate (MFR) atactic PP made by polymerizing propylene in the presence of $Me_2Si[Me_4CpN(C_{12}H_{23})]TiCl_2$ and methylalumoxane in solution conditions.

Example 2

Several blends, A–H, were physically mixed using a Brabender Counter rotating mixer using the small mixing head (45 ml). Mixing conditions were as follows:

The head was preheated to 190° C. for 5 minutes. A manually blended mixture was fed into the mixing chamber with screws rotating at 60 rpm. The mixture was blended for 5 minutes and then removed. The blends were then compression molded. The blends and the test data are reported in Table 2.

Several blends (M–T) were mixed and pelletized using two passes through a single screw extruder with a 200 mesh screen pack. The pellets were injection molded into test pieces.

TABLE 2

| Blend | PP (g) | ENB (g) | wt. % Rubber |
|---|---|---|---|
| A | PP5 (0.032) | ENB1 (0.6) | 95% |
| B | PP5 (0.07) | ENB1 (0.6) | 90% |
| C | PP5 (0.106) | ENB1 (0.6) | 85% |
| D | PP5 (0.4) | ENB1 (0.6) | 60% |
| E | PP5 (0.6) | ENB1 (0.6) | 50% |
| F | PP3 (36.31) | ENB2 (90.4) | 20% |
| G | PP3 (27.15) | ENB2 (18.14) | 40% |
| H | PP4 (34.92) | ENB3 (11.64) | 25% |
| M* | PP1 (10 lbs) | none | 4% |
| N* | PP1 (9.6 lbs) | ENB5 (181.6 g) | 4% |
| O* | PP1 (9.6 lbs) | VISTALON 457 ™ (181.6 g) | 4% |
| P | PP2 (9.6 lbs) | ENB5 181.6 g) | 4% |
| Q | PP2 (9.6 lbs) | Vistalon 719 ™ (181.6 g) | 4% |
| R | PP2 (9.6 lbs) | Vistalon 404 ® (181.6 g) | 4% |
| S | PP2 (9.6 lbs) | Vistalon 457 ™ (181.6 g) | 4% |
| T | PP2 (10 lbs) | none | 4% |

* = 550 ppm of BHT and 800 ppm of calcium sterate were added as a stabilizing package.

The copolymers were selectively tested for norbornene content by carbon nuclear magnetic resonance (CNMR) and/or proton NMR ($^1$HNMR); molecular weight ($M_w$) and molecular weight distribution ($M_w/M_n$) by gel permeation chromatography; and glass transition temperature ($T_g$) by differential scanning calorimetry (DSC) using ASTM E 1356. The DMTA was done on a Polymer Laboratories, Inc. DMTA apparatus using a single cantilever head and a 2° C./min. temperature ramp according to the manufacturer's recommended procedures at 1 Hz and 10 Hz from -120° C. to 150° C. Physical properties such as tensile strength at break; elongation at break; tensile strength at 150% strain; and recovery (100 minus tension set) were measured according to ASTM 638. Physical properties were measured on an Instron tensile testing apparatus at 4 in./min. (200%/min.), and the recovery data at 20 in./min. (1000%/min.). Testing was at ambient conditions unless otherwise indicated. Youngs modulus and yield stress were measured by a ASTM 638. Flexural strength was measured by ASTM 638.1 % Secant flexural modulus was measured by ASTM D 790. Gardner impact was measured by ASTM D 5420. Tm was measured by DSC, second melt. Mold shrinkage is measured by ASTM D 955. 60° gloss is measured by ASTM 2457.

The blends were injection molded into plaques and tested for tensile at break, elongation at break, yield stress, Young's Modulus, flex strength, 1% Secant flexural modulus, Gardner Impact at 23° C., melting point (Tm), crystallization temperature (Tc), mold shrinkage and 60° gloss. The results are presented in Table 3a and 3b.

TABLE 3a

| Blend | Tensile at break (psi/MPa) | Elong. at break (%) | Yield stress (psi/MPa) | Young's modulus (psi/MPa) | Flex Strength (psi/MPa) |
|---|---|---|---|---|---|
| M | 3491/24.0 | 730 | 5189/35.7 | 109723/756.5 | 7164/49.3 |
| N | 3193/22.0 | 656 | 5041/34.7 | 109889/757.6 | 6963/48.0 |
| O | 3018/20.8 | 771 | 4758/32.8 | 98296/677.7 | 6409/44.1 |
| P | 3233/22.2 | 889 | 4712/32.4 | 91651/631.9 | 5855/40.4 |

TABLE 3a-continued

| Blend | Tensile at break (psi/MPa) | Elong. at break (%) | Yield stress (psi/MPa) | Young's modulus (psi/MPa) | Flex Strength (psi/MPa) |
|---|---|---|---|---|---|
| Q | 2759/19.0 | 817 | 4259/31.2 | 70965/489.3 | 5652/38.9 |
| R | 3143/21.6 | 928 | 4437/30.5 | 83668/576.8 | 5383/37.1 |
| S | 3093/21.3 | 950-NB | 4404/30.3 | 71120/490.3 | 5476/37.7 |
| T | 3337/23.0 | 950-NB | 4794/33.0 | 88281/608.6 | 5883/40.5 |

NB = no break

TABLE 3b

| Blend | Secant 1 mod. (psi/MPa) | Gardner impact (in/lbs) | Tm (° C.) | Tc (° C.) | Mold shrinkage (%) | 60° gloss (%) |
|---|---|---|---|---|---|---|
| M | 252727/1743 | 8.2 Br | 168/160 | 114 | 1.35 | 87.6 |
| N | 247397/1706 | 61 BrSh | 168/160 | 115 | 1.36 | 87.1 |
| O | 230029/1586 | 197 DuSh | 168/160 | 116 | 1.29 | 87.0 |
| P | 200500/1382 | 167 DuSh | 160 | 115 | 1.3 | 87.4 |
| Q | 193079/1331 | 163 DuSh | 161/144 | 113 | 1.3 | 86.9 |
| R | 183279/1264 | 167 Du | 166/155 | 112 | 1.25 | 86.7 |
| S | 192026/1324 | 177 Du | 166/155 | 113 | 1.22 | 86.8 |
| T | 201100/1387 | 118 DuSh | 161.4 | 120.2 | 1.21 | 87.4 |

Du = ductile, Sh = shatter, Br = brittle

Izod tests were also conducted according to ASTM D-256. The results are reported in Table 4.

TABLE 4

(Izod impact results in ft-lbs/in (J/cm))

| Blend | Notched 23° C. | Unnotched 23° C. | Unnotched -18° C. | Unnotched -23° C. | Unnotched -40° C. |
|---|---|---|---|---|---|
| M | 0.65/4.4 | 32.7/225.4 | 4.0/27.5 | 3.3/22.7 | 3.8/26.2 |
| N | 0.68/4.6 | 30.4/209.6 | 4.5/31.0 | 3.6/24.8 | 2.8/19.3 |
| O | 0.88/6.0 | 30.0/206.8 | 5.7/39.3 | 4.4/30.3 | 4.5/31.0 |
| P | 0.47/3.2 | 22.5/155.1 | 3.1/21.3 | 2.8/19.3 | 2.8/19.3 |
| Q | 0.60/4.1 | 30.3/208.9 | 3.2/22.0 | 2.7/18.6 | 3.1/21.3 |
| R | 0.70/4.8 | 30.1/207.5 | 4.0/27.5 | 4.4/30.3 | 3.4/23.4 |
| S | 0.74/5.1 | 30.2/208.2 | 3.8/26.2 | 4.2/28.9 | 3.9/26.8 |
| T | 0.66/4.5 | 27.4/188.9 | 4.1/28.2 | 4.0/27.5 | 3.8/26.2 |

Blends M through T compared the physical and mechanical properties of two polypropylenes blended with E/NB rubber and different commercial EP rubbers to the non-blended PP. Both rubbers provide significant impact resistance improvement, but the E/NB modified polymers show no loss of tensile strength or flex strength as the EP modified polymers do (Table 3 and 4). In addition there is no loss of surface gloss incurred by adding E/NB rubber as there is when adding EP rubber (particularly evident with the commercial PP blends P through T). The mold shrinkage results were inconclusive at these rubber levels. The E/NB modified polymers retained low temperature impact properties as measure by the IZOD impact lest (Table 4) down to somewhere between -18° and -29° C. but lost impact resistance at -40° C.

Typically there is an inverse relationship between strength and impact resistance in a blend of semi-crystalline polymer and rubbery copolymer. (As more rubber is added to the semi-crystalline polymer, its impact properties improve, but strength is lost.) This relationship may be represented by a line drawn between the Modulus and Gardner Impact values for homopolypropylene and the values of 160,000 psi Modulus and 320 ft-lbs Garner Impact. Most of the commercial impact modified PP's have properties that fall on or close to this line. It is desirable to find impact modifying rubbers that result in values that are above and to the right of this line. FIG. 1 plots 1% Secant flexural modulus (kpsi) vs. 23° C. Gardner Impact (ft-lb) for five compositions.

| Symbol | Description |
|---|---|
| ■ | ESCORENE ™ 1012 polypropylene |
| ● | Blend P |
| ▲ | Blend Q |
| X | Blend R |
| Z | Blend S |

Blends Q, R, and S, all modified with commercially available elastomers, have properties that fall close to the line connecting the two squares in FIG. 1, which represents the expected behavior. Blend P, an example of the present invention, had the greatest impact improvement without a loss of strength, and as a result falls well above the expected behavior line. This is a significant improvement that will be magnified in blends with higher rubbery thermoplastic copolymer content.

In summary, the instant blends provide impact resistance to PP without loss of tensile strength, flex strength, or surface gloss as the commercial EP rubber blends do. The instant blends provide this impact resistance even at below ambient temperatures, in a temperature range that is commercially significant.

It is well known in the art that crosslinking of the rubber phase after it has been dispersed in the semi-crystalline polymer can improve the toughness of the blend. Crosslinking by peroxide cure treatment, E-beam treatment, or gamma irradiation treatment acts to increase the molecular weight of the rubber phase and prevent migration or aggregation of the rubber particles. In another embodiment of this invention the alpha-olefin/cyclic olefin rubber phase of the blend is crosslinked, preferably using a peroxide cure treatment to increase the molecular weight of the rubber phase, and thereby the overall toughness of the PP blend. Typical peroxides include di-cumyl peroxide and di-t-butyl peroxide.

Example 3

11.6 of PP4 was physically admixed with 11.6 g of ENB3 then poured into a preheated Brabender with 0.1201 g of di-t-butyl peroxide (98.5 % pure). The components were blended for ten minutes at 190 C. using a small 45 g mixing head. The cured blend was then tested for physical properties. The data for the cured blend, one uncured blend and neat polypropylene are summarized in Table 5.

TABLE 5

Strain Behavior of PP/Rubber Blends Before And After Peroxide Cure

| Host Polymer MFR | Rubber ID Weight % Rubber | Approximate Young's Modulus (psi) | % Strain at Maximum Load | Energy-To-Break (lb-in) | Tensile Energy Absorption (lbs/in) |
|---|---|---|---|---|---|
| PP3 (35) | None 0% | | 12 | 20 | 100 |
| PP3 (35) | ENB2 20% | 78,600 | 9 | 5 | 31 |
| PP4* (7.5) | ENB3 25% | 71,700 | 404 | 132 | 802 |

*di-t-butyl peroxide

The data show that the rubbery thermoplastic copolymer will crosslink to improve the toughness of the blends to such an extent that they are competitive in properties with commercial reactor thermoplastic olefins. The instant blends are different however because the rubbery thermoplastic copolymer has a higher packing length than the semi-crystalline polymer causing it to be excluded from the surface. Packing length is defined and measured or calculated in Fetters, L. J., Lohse, D. J. Richter, D., Witten, T. A., and Zirkel, A. Macromolecules, 1994 incorporated by reference herein. After crosslinking the rubber phase the rubber particles remain excluded from the surface causing no loss of surface properties while increasing the toughness significantly. Evidence that the rubbery copolymer is excluded from the surface is provided by X-ray photoelectron spectroscopy (XPS) which gave unperturbed, characteristic PP spectra before and after blending rubber, as well as before and after peroxide cure treatment.

The following tables illustrate how the thermoplastic vulcanizates of the invention can be prepared and how the physical properties of the thermoplastic vulcanizates can be modified or adjusted by changing the mix procedures, compositions, and other variables in their preparation. The designation of the rubber formula by $C_2$-NB-ENB or $C_2$–$C_3$-NB-ENB will be used and designates an ethylene-norbornene-ethylidene norbornene polymer or an ethylene-propylene-norbornene-ethylidene norbornene polymer, respectively. Normally the ratios of the three monomers in the feed are given in a heading or in a footnote for each table. Some unvulcanized compositions are shown to illustrate the effect of vulcanization on polymer compatibility and on physical properties of the vulcanizates. In particular, the dispersion of the semi-crystalline polyolefin with the rubber is generally improved by dynamic vulcanization.

Table VI shows numerous examples of both crosslinked and uncrosslinked thermoplastic vulcanizates made from semi-crystalline thermoplastic polypropylene blended with a rubber. The rubber composition varies from having 8, 12 or 15 mole percent norbornene in the monomer feed. The amount of ethylidene norbornene is generally very low, i.e., between 1 and 10 mole percent in the feed and the residual moles of monomer in the norbornene polymer are ethylene. A comparison of Examples A1 and A2 shows that vulcanization dramatically decreases compression set and oil swell. Examples A3 and A4 illustrate that a softer composition than A1 and A2 can be prepared by adding a naphthenic oil to the composition. This addition of naphthenic oil also reduced the oil swell of the final thermoplastic vulcanizate. Examples A5 and A6 illustrate that a still softer composition can be prepared by decreasing the relative amount of thermoplastic polypropylene phase to the rubber phase. It is to be noted that the compression set was decreased by decreasing the amount of polypropylene. Examples A7 and A8 may be best compared to unplasticized samples A1 and A2. Examples A7 and A8 have very comparable physical properties to A1 and A2 even though the amount of norbornene repeat units in the polymer was increased from 8 to 12 mole percent. Examples A9 and A10 can be best compared to samples A3 and A4 as they have comparable amounts of oil plasticization. Samples A9 and A10 have slightly better tensile strength than A3 and A4, but also have slightly higher compression set and slightly higher oil swell.

TABLE VI

Evaluation of Blend Including C$_2$-NB-ENB
With Polypropylene (Different Mole Percent of NB)

| Norbornene Content, % | | | 8 mole (27.2 wt.) | | | | 12 mole 40.8 wt. | | 15 mole 51 wt. | |
|---|---|---|---|---|---|---|---|---|---|---|
| Examples | A1 | A2 | A3 | A4 | A5 | A6 | A7 | A8 | A9 | A10 |
| C$_2$-NB-ENB | 100 | 100 | — | — | — | — | — | — | — | — |
| C$_2$-NB-ENB plus oil[1] | — | — | 145 | 145 | 145 | 145 | — | — | — | — |
| C$_2$-NB-ENB | — | — | — | — | — | — | 100 | 100 | — | — |
| C$_2$-NB-ENB | — | — | — | — | — | — | — | — | 19.8 | 19.8 |
| C$_2$-NB-ENB plus oil[2] | — | — | — | — | — | — | — | — | 126.8 | 126.8 |
| Polypropylene | 66.7 | 66.7 | 96.7 | 96.7 | 66.9 | 66.9 | 66.7 | 66.7 | 96.7 | 96.7 |
| Zinc oxide | — | 2.0 | — | 2.9 | — | 2.0 | — | 2.0 | — | 2.9 |
| SnCl$_2$ | — | 2.0 | — | 2.9 | — | 2.0 | — | 2.0 | — | 2.9 |
| SP-1045 (phenolic resin) | — | 5.5 | — | 8.0 | — | 5.5 | — | 5.5 | — | 8.0 |
| Physical Properties of Blend | | | | | | | | | | |
| Hardness, Shore D | 52 | 52 | 44 | 44 | 35 | 36 | 51 | 55 | 43 | 47 |
| 100% Modulus MPa | 10.6 | 11.9 | 8.0 | 10.2 | 5.8 | 7.1 | 11.4 | 12.2 | 8.6 | 9.2 |
| Tensile Strength, Mpa | 23.2 | 23.2 | 10.5 | 17.1 | 9.6 | 13.1 | 17.0 | 27.9 | 16.2 | 20.0 |
| Elongation at break, % | 406 | 315 | 281 | 262 | 366 | 260 | 273 | 345 | 419 | 364 |
| Tension Set, % | 40 | 38 | 44 | 32 | 32 | 21 (35)[3] | 38 (41)[3] | 46 | 41 | 36 |
| Compression Set, % 22 hr @ 100° C. | 95 | 43 | 89 | 55 | 39.3 | 20.9 | 89 | 69 | 99 | 73 |
| Oil Swell, % 3 day @ 125° C. | 253 | 140 | 146 | 68.5 | 191.1 | 80.5 | 235 | 134 | 153 | 78 |

[1]Contains 45 phr Hyprene V-1200 oil (naphthenic oil)
[2]Contains 55 phr Hyprene V-1200 oil (naphthenic oil)
[3]Repeat Table VII shows the effects of oil and vulcanization of blends of polypropylene and the rubber. A comparison of B12 to B11 illustrates hat a paraffinic oil (Sunpar 150) significantly softened the blend of polypropylene and the rubber. A comparison of B13 with B12 shows that a naphthenic oil (Tuflo-2000) gave better ultimate tensile strength, elongation at break, and 100 percent modulus than similar plasticization with the paraffinic oil in Example B12. A comparison of Example B15 to Example B14 shows that an addition of a paraffinic oil (Sunpar-150) resulted in a much softer thermoplastic vulcanizate. A comparison of Example B16 to B15 and B14 shows that the addition of a naphthenic oil (Tuflo-2000) resulted in similar decreases in Shore A hardness compared to paraffinic oil as shown in B15 but also resulted in greater physical properties such as the elongation to break, ultimate tensile strength, and 100 percent modulus than did the addition of paraffinic oil. Example B17 can be compared to Examples B14 through B16. Example B17 shows the addition of paraffinic oil in two increments, one before vulcanization and one after vulcanization. Ultimate tensile strength properties from this procedure are slightly preferable to the results using naphthenic oil and paraffin oil in single additions (B15 and B16). Example B18 shows the effect of adding the naphthenic oil in two portions, one before vulcanization and one after vulcanization. Although this technique is desirable, the change in physical properties were not as significant as with paraffinic oil (Example B17 versus Example B15).

TABLE VII

Evaluation of Blend Including C$_2$-NB-ENB With Polypropylene (19.5 Mole Percent of NB)

| Example | B11 | B12 | B13 | B14 | B15 | B16 | B17 | B18 |
|---|---|---|---|---|---|---|---|---|
| C$_2$-NB-ENB[1] | 100 | 100 | 100 | 100 | 100 | 100 | 100 | 100 |
| Polypropylene | 66.7 | 66.7 | 66.7 | 66.7 | 66.7 | 66.7 | 66.7 | 66.7 |
| Sunpar-150 (paraffinic oil) | — | 38.7 | — | — | 38.7 | — | 14.3 | — |
| Tuflo-2000 (naphthenic oil) | — | — | 38.7 | — | — | 38.7 | — | 14.3 |
| Zinc oxide | — | — | — | 2.0 | 2.0 | 2.0 | 2.0 | 2.0 |
| SnCl$_2$—H$_2$O | — | — | — | 2.0 | 2.0 | 2.0 | 2.0 | 2.0 |
| SP-1045 | — | — | — | 5.5 | 5.5 | 5.5 | 5.5 | 5.5 |
| Additional Ingredients Added Two Minutes After Curing | | | | | | | | |
| Sunpar-150 | — | — | — | — | — | — | 24.4 | — |
| Tuflo-2000 | — | — | — | — | — | — | — | 24.4 |

TABLE VII-continued

Physical Properties

| | | | | | | | | |
|---|---|---|---|---|---|---|---|---|
| Visual Evaluation | — | Sticky | — | — | Speckled | — | — | — |
| Hardness Shore A/D | 57(D) | 85(A) | 84(A) | 57(A) | 86(A) | 87(A) | 88(A) | 90(A) |
| Ultimate Tensile Strength MPa | 36.9 | 9.7 | 14.2 | 31.7 | 14.3 | 17.5 | 19.2 | 18.1 |
| Elongation at Break | 406 | 512 | 535 | 400 | 360 | 411 | 387 | 378 |
| 100% Modulus MPa | 15.3 | 5.3 | 6.4 | 14.8 | 6.5 | 6.9 | 6.8 | 7.0 |
| Tension Set, % | 55.8 | 46.7 | 46.2 | 64.8 | 29.7 | 27.6 | 20.6 | 25.6 |
| Compression Set, % 22 hr @ 100° C. | 95.6 | 96.4 | 92.2 | 67.0 | 61.5 | 55.7 | 50 | 58.3 |
| Oil Swell, % 3 days @ 125° C. | dissolved | dissolved | Dissolved | 134.5 | 119.2 | 119.4 | 95.3 | 97.2 |

[1]$C_2$-NB-ENB Feed g/hr 95.00 80.00 10.00
Moles 3.39 .84 .03
Mole % 78.60 19.50 1.90

Table VIII shows the effect of paraffinic and naphthenic oils, and vulcanization on a blend of polypropylene and the rubber. The rubber in Table VIII differs from the rubber in Table VII in that it has a higher percentage of repeat units from norbornene. A comparison of Example C20 which is plasticized with paraffinic oil and C19 which is not plasticized shows a reduction in the Shore D hardness and a reduction in the ultimate tensile strength. A comparison of Example C21 with Examples C19 and C20 shows the addition of a naphthenic oil which resulted in less decrease in the physical properties than C20 with paraffinic oil with a similar change in the Shore D hardness. It should also be noted that Examples C20 and C21 also show a dramatic change in the elongation at break achieved by adding oil to the composition of Example C19. The comparison of Example C22 to Example C19 shows little effect from the inclusion of zinc oxide and stannous chloride. The comparison of Example C23 to Example C20 shows that dynamic vulcanization did not change the Shore D or tensile properties very much, but did significantly reduce oil swell and compression set. A comparison of Example C24 to C23 shows a slightly harder composition results from the use of naphthenic oil than paraffin oil. The comparison of Example C25 to Example C24 shows that the addition of the naphthenic oil in two increments, one before vulcanization and one after vulcanization only resulted in a slightly softer composition.

TABLE VIII

Evaluation of Blend Including $C_2$-NB-ENB With Polypropylene (28 Mole Percent of NB)

| Example | C19 | C20 | C21 | C22 | C23 | C24 | C25 |
|---|---|---|---|---|---|---|---|
| $C_2$-NB-ENB[1] | 100 | 100 | 100 | 100 | 100 | 100 | 100 |
| Polypropylene | 66.7 | 66.7 | 66.7 | 66.7 | 66.7 | 66.7 | 66.7 |
| Zinc oxide | — | — | — | 2.0 | 2.0 | 2.0 | 2.0 |
| SnCl$_2$ | — | — | — | 2.0 | 2.0 | 2.0 | 2.0 |
| Sunpar ™-150 (paraffinic oil) | — | 38.7 | — | — | 38.7 | — | |
| Tuflo ™-2000 (naphthenic oil) | — | — | 38.7 | — | — | 38.7 | 14.3 |
| SP-1045 (phenolic resin) | — | — | — | 5.5 | 5.5 | 5.5 | 5.5 |
| Tuflo ™-2000 (added 2 minutes after curing) | — | — | — | — | — | — | 24.4 |
| Physical Properties | | | | | | | |
| Hardness Shore A/D | 77(D) | 47(D) | 50(D) | 76(D) | 49(D) | 56(D) | 52(D) |
| Ultimate Tensile Strength MPa | 38.3 | 16.4 | 27.0 | 29.6 | 15.8 | 17.4 | 13.4 |
| Elongation at Break | 11 | 334 | 428 | 5 | 274 | 297 | 197 |
| 100% Modulus Mpa | — | 9.0 | 10.2 | — | 10.1 | 11.8 | 11.7 |
| Tension Set, % | — | 43.2 | 46.2 | — | 41.7 | 58.8 | — |
| Compression Set, % 22 hr @ 100° C. | 93.4 | 95.1 | 95.9 | — | 71.2 | 75.2 | 72.2 |
| Oil Swell, % 3 days @ 125° C | dissolved | dissolved | dissolved | — | 98.6 | 105.1 | 103 |

[1]$C_2$-NB-ENB Feed g/hr 95.00 130.00 10.00
Moles 3.39 1.37 .08
Mole % 70.00 28.00 2.00

Table IX shows blends of polypropylene and a terpolymer of ethylene propylene, norbornene and ethylidene norbornene in vulcanized and unvulcanized condition and including a paraffinic oil. Example D26 shows the blend has softer Shore A values than previously seen on an unplasticized blend. Example D27 when compared to Example D26 shows that a vulcanized blend has better oil swell resistance and slightly slower compression set. Example D28 can be compared to Example D26 Example D29 can be compared to either Example D27 or Example D28 and shows that the addition of oil to a vulcanized blend results in a slightly softer material with lower tension set and lower oil swell but slightly higher compression set. The comparison of Example D29 to Example D28 shows that vulcanization of an oil extended blend results in a slightly harder material but better ultimate tensile strength, slightly lower elongation at break, lower tension set, dramatically lower oil swell and lower compression set. Blends of two or more cyclic olefin copolymers can be used in thermoplastic vulcanizates.

TABLE IX

Evaluation of Tetrapolymer $C_2$—$C_3$-NB-ENB Blend With Polypropylene

| Sample | D26 | D27 | D28 | D29 |
|---|---|---|---|---|
| $C_2$—$C_3$-NB-ENB[1] | 100 | 100 | 100 | 100 |
| Polypropylene | 66.67 | 66.67 | 66.9 | 66.9 |
| Sunpar 150 (paraffinic oil) | — | — | 50 | 50 |
| Zinc oxide | — | 2.0 | — | 2.0 |
| $SnCl_2 \cdot H_2O$ | — | 2.0 | — | 2.0 |
| SP-1045 (phenolic resin) | — | 5.5 | — | 5.5 |
| Physical Properties | | | | |
| Hardness, Shore A/D | 62(A) | 65(A) | 85(A) | 87(A) |
| 100% Modulus MPA | — | — | 5.8 | 6.6 |
| Ultimate Tensile Strength, Mpa | 32.1 | 29.6 | 11.8 | 17.5 |
| Elongation at Break, % | 413 | 376 | 545 | 404 |
| Tension Set, % | 80 | 81 | 50.8 | 24.6 |
| Compression Set, % 22 hr @ 100° C. | 41.4 | 34.5 | 90.4 | 59.8 |
| Oil Swell, % 3 days @ 125° C. | dissolved | 131.1 | dissolved | 104 |

[1]$C_2$—$C_3$-NB-ENB Feed   $C_2$ $C_3$ NB ENB
                              —   —   —  —   Mole Percent The thermoplastic vulcanizates of this disclosure are useful as molding compounds for a variety of articles such as automobile underhood parts, engineering and construction materials, mechanical rubber goods, industrial parts such as hose, tubing and gaskets, electrical applications, and household goods.

As is apparent from the foregoing description, the materials prepared and the procedures followed relate to specific embodiments of the broad invention. It is apparent from the foregoing general description and the specific embodiments that, while certain forms of the invention have been illustrated and described, various modifications can be made without departing from the spirit and scope of this invention. Accordingly, it is not intended that the invention be limited thereby.

What is claimed:

1. A blend comprising; a) about 15 to about 90 wt. % of a fully cured rubbery copolymer including from about 5 to about 30 mole % repeat units from a monounsaturated cyclic olefin, from about 69 to about 94 mole % repeat units from at least one monounsaturated alpha-olefin monomer, and from about 1 to about 3 mole % repeat units from at least one polyene monomer, b) about 10 to about 85 wt. % of a semi-crystalline polymer, wherein said weight percents are based upon the total weight of said rubbery copolymer and said semi-crystalline polymer
   wherein said rubbery copolymer is crosslinked via said repeat units from at least one polyene monomer.

2. A blend according to claim 1, further including from about 30 to about 250 parts by weight of an extender oil per 100 parts by weight of said rubbery copolymer.

3. A blend according to claim 1, further including from about 40 to about 250 parts by weight of a filler per 100 parts by weight of said rubbery copolymer.

4. A blend according to claim 1, wherein the amount of said rubbery copolymer is from about 25 to about 80 wt. % and the amount of said semi-crystalline polymer is from about 20 to about 75 wt. %.

5. A blend according to claim 4, wherein the mole % of said repeat units from a cyclic olefin is from about 10 to about 25 mole %.

6. A blend according to claim 5, wherein said monounsaturated cyclic olefin is one or more cyclic olefins selected from norbornene, monoalkyl substituted norbornene, and dialkyl substituted norbornene.

7. A blend according to claim 5 in the shape of a molded or extruded part.

8. A blend according to claim 5, wherein said semi-crystalline polymer is a semi-crystalline polypropylene or a semi-crystalline polyethylene.

9. A blend according to claim 1, wherein said semi-crystalline polymer is a semi-crystalline polypropylene.

10. A process for producing a blend of a semi-crystalline polymer and a crosslinked rubbery copolymer, said process including,
   a) blending a semi-crystalline polymer and a rubbery copolymer in uncrosslinked form, wherein said rubbery copolymer includes repeat units with a residual carbon to carbon double bond reactive in crosslinking reactions of free radical and phenolic resin crosslinking systems,
   b) fully crosslinking said rubbery copolymer by forming chemical bonds between the chains of said copolymer at said repeat units having residual carbon to carbon double bonds, the improvement wherein the rubbery copolymer is a copolymer of from about 5 to about 30 mole % repeat units from at least one monounsaturated cyclic olefin monomer, from about 69 to about 94 mole % repeat units from at least one monounsaturated alpha-olefin monomer, and from about 1 to about 3 mole % repeat units from at least one polyene.

11. A process according to claim 10 wherein said repeat units from said cyclic olefin monomer are present from about 10 to about 25 mole.

12. A process according to claim 11, wherein said cyclic olefin monomer comprises one or more monomers selected from norbornene, monoalkyl substituted norbornene, and dialkyl substituted norbornene.

13. A process according to claim 10, wherein said semi-crystalline polymer is a semi-crystalline polyethylene or a semi-crystalline polypropylene.

* * * * *